Dec. 20, 1938.  F. W. COTTERMAN  2,140,690

AUTOMATIC PLANETARY AUTOMOTIVE TRANSMISSION

Filed Jan. 20, 1936  5 Sheets-Sheet 1

INVENTOR.
Frederick W. Cotterman

Dec. 20, 1938.  F. W. COTTERMAN  2,140,690

AUTOMATIC PLANETARY AUTOMOTIVE TRANSMISSION

Filed Jan. 20, 1936  5 Sheets-Sheet 2

INVENTOR.
Frederick W. Cotterman

Dec. 20, 1938.    F. W. COTTERMAN    2,140,690
AUTOMATIC PLANETARY AUTOMOTIVE TRANSMISSION
Filed Jan. 20, 1936    5 Sheets-Sheet 3

INVENTOR.
Frederick W. Cotterman

Patented Dec. 20, 1938

2,140,690

UNITED STATES PATENT OFFICE 2,140,690

AUTOMATIC PLANETARY AUTOMOTIVE TRANSMISSION

Frederick W. Cotterman, Dayton, Ohio, assignor of one-half to Bessie D. Apple, Dayton, Ohio Application January 20, 1936, Serial No. 59,879

18 Claims. (Cl. 74—260)

This invention relates to power transmission mechanism and embodies some of the features of my copending applications Serial Nos. 26,765 and 40,946, filed June 15, 1935 and September 17, 1935, respectively. It is particularly applicable to motor vehicles.

An object of the invention is to provide a transmission mechanism wherein the most used or middle portion of the driving range of a vehicle will be effected thru direct drive, that is, without the use of any of the gearing in the transmission mechanism.

A second object is to include in the mechanism a single planetary speed reducing gear-set, which may hereinafter be termed the underdrive, which is responsive to speed and torque and which becomes automatically operative when load conditions are such as to either decelerate the vehicle or prevent sufficiently rapid acceleration thereof in direct drive, but which is nevertheless also subject to the will of the operator in that he may, by suddenly changing the amount of applied power by means of the engine throttle, cause the automatic clutch to act and change from gear drive to direct or vice versa as desired.

Another object is to connect the underdrive gear-set to the engine thru a fluid coupling, in order that considerably less reduction in speed need be had thru the gear-set, to the end that no engine rushing will result in bringing the vehicle from a dead stop thru the single speed reduction to a desirable speed for direct drive.

Another object is to include in the underdrive gear-set a plate friction clutch automatically engageable to provide direct drive and render the gearing inoperative, and a jaw clutch automatically engageable to provide gear drive whenever the plate clutch is disengaged, to the end that the gearing may remain in constant mesh without including in the mechanism any such device as a roller clutch or a spring clutch both of which have been found to be a source of trouble.

Another object is to provide, in the underdrive gear-set, gearing with helical teeth, so angled that the tangential load carried by the gearing causes an end thrust in a direction proper for disengaging the plate clutch, with means to apply the end thrust to the plate clutch to disengage it and keep it fully disengaged as long as the gearing is transmitting any power.

Another object is to provide a resilient means always operative to urge the plate clutch to become and remain engaged and centrifugal weight means for stressing the resilient means more as the speed increases, the force of the weights being applied to stress the resilient means thru a leverage wherein the power arm becomes progressively shorter and the work arm progressively longer as the weight moves farther from its axis of rotation, whereby the stress of the resilient clutch engaging means will increase more nearly as the square root of the R. P. M. instead of as the square of the R. P. M. as is the case where centrifugal means is applied directly or thru an unvarying leverage as in common practice, to the end that sufficient clutch engaging pressure may be had at the lower speeds without having too great a clutch engaging pressure at the higher speeds.

Another object is to provide, in a gear mechanism which automatically changes from gear drive to direct drive and vice versa, means for making the change from one drive to the other without a time interval between them, the one drive becoming effective before the other drive lets go, to the end that there will be no time between direct drive and gear drive in which there is no drive, as there is in conventional gear shift transmissions.

Another object is to include in the transmission mechanism a planetary speed increasing gear-set which may hereinafter be designated an overdrive, which may become operative only above a relatively high predetermined speed, to the end that the lesser portion of driving only which is done at very high speeds need be done thru this gearing, leaving all normal speeds to be effected without any gearing being operative.

Another object is to provide in connection with the overdrive gearing, such two way driving connections as will insure that the engine is always either driving the vehicle or is being driven thereby, to the end that there will be no overrunning clutches in the mechanism and no free wheeling.

Another object is to provide, in connection with the overdrive gear-set, a direct drive friction clutch normally held engaged by a resilient means, whereby the overdrive gearing is kept inoperative, and centrifugal weights operative to overcome the resilient means to disengage the said clutch to permit said overdrive gears to become operative, with means operated by the thrust of the helical teeth of the gearing to vary the speed at which the weights overcome the resilient means, whereby the speed at which the overdrive gearing becomes effective will be somewhat higher as the load being overcome is greater.

Another object is to provide an overdrive friction brake wherein one element is secured to the transmission housing which, upon engagement, holds the sun gear of the overdrive gear-set against rotation whereby the overdrive gear-set becomes operative, the helical teeth of the overdrive sun gear being angled to provide an axial thrust sufficient and in the right direction to hold the said overdrive clutch in engagement as long as power is being transmitted through said gearing.

Another object is to provide means thru which the same overdrive gear-set may be used also as a speed reducing gear-set for reversing the vehicle, to the end that no additional gears need be provided for this purpose.

Another object is to provide a manually operable means operative to three positions to provide forward, neutral, and reverse connections between the engine and the vehicle wheels, said means being positioned between the underdrive and overdrive gear-sets.

Another object is to provide a centrifugal means for operating the overdrive gearing which will insure that when a shift from direct to overdrive or vice versa has once begun to take place the operation will not be interrupted until a complete change from one to the other has occurred.

Another object is to provide in both the underdrive and overdrive mechanisms means for causing the centrifugal weights of a set to all move together to the end that no one weight of a set may move outwardly ahead of the others and cause an unbalanced effect.

That I attain these and many other objects and meritorious features will become apparent as the invention is described in more detail and reference is had to the drawings wherein.

A part designated by a given numeral in any one view will not be designated by a different numeral in any of the other views.

The crank shaft 30 of an internal combustion engine carries a fluid coupling comprising the flywheel 32 to the outer face of which the cover 34 is secured by screws 36. The cover 34 carries the driving vanes 38 and a hub 40 having a bearing bushing 42 within which the driven element rotates.

The driven element 44 carries the vanes 46 and the central hollow journal 48 upon which the driven member has rotative bearing. The journal 48 is internally splined to receive the externally splined drive shaft 50 of the underdrive gear-set. A ball bearing 52 is provided to take the thrust of the driven element 44. A flywheel cover 54 encloses the flywheel and coupling and supports the transmission housing.

The outer face of the cover 54 is closed by the end wall 55 which serves also as the front end closure of the transmission housing.

The forward portion of the transmission housing comprises integrally a large cylindrical part 56 and a smaller cylindrical part 57 separated by a central partition 58. The rearward portion comprises a shell 60 and the ball bearing cap 62, the underdrive gear-set being contained in the space forward of the partition 58, and the overdrive gear-set and manually operable forward, neutral, and reverse mechanism being contained in the space rearward of the partition and in the rearward portion 60.

The transmission mechanism comprises three shafts all in axial alignment, a drive shaft, an intermediate shaft, and a driven shaft, the fluid coupling being mounted on the drive shaft, the underdrive gear-set on the intermediate shaft, and the remainder of the mechanism on the driven shaft.

Both of the gear sets herein employed are of the planetary type which comprise a sun gear, several planet pinions surrounding it and meshing therewith, a carrier for supporting the planet pinions for both rotation upon their axes and revolution about the sun gear, and a ring gear surrounding and meshing with all of the planet pinions.

In the underdrive gear-set (see Figs. 1 to 11) the splined drive shaft 50 is rotatable in ball bearing 63 supported in the end wall 55. Drive shaft 50 has a flange 51 to which the ring gear 64 is secured by the rivets 53. Ring gear 64 has helical teeth 66 on the inside of the ring and external clutch teeth 68 on the outside, the gear teeth 66 being the driving means for gear drive and the clutch teeth 68 being the driving means for direct drive.

The intermediate shaft 70 is rotatable in roller bearing 72 supported in the end of the drive shaft 50, the other end of the shaft 70 being in turn supported by a roller bearing 74 rotatable in a cage 76 secured by rivets 78 to the center partition 58. The cage 76 is shown in detail in Fig. 3.

Driven shaft 70 has external splines 80 over which the internally splined hub 82 of the planet pinion carrier 84 fits snugly. The carrier 84 supports four circumferentially equally spaced bearing studs 86 having roller cages 88 upon which the planet pinions 90 rotate in mesh with the teeth 66 of the ring gear 64.

Figures 8, 9, 10, 11:
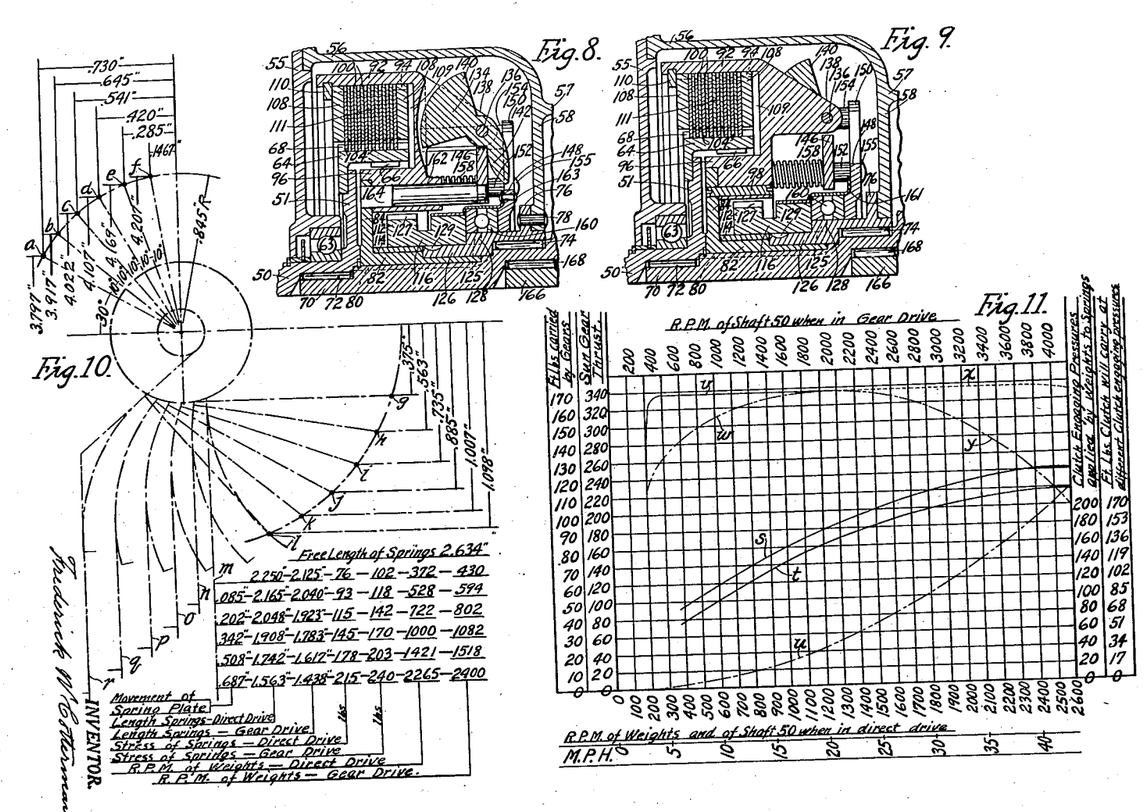
Fig. 8 is a partial section taken thru Figs. 5 and 6 at 8—8, showing an underdrive weight in contact with the spring pressure plate and one of the pins for guiding the pressure plate in its axial movement.
Fig. 9 is a partial section taken thru Figs. 5 and 6 at 9—9, showing the underdrive planet pinion carrier construction.
Fig. 10 shows diagrammatically the action of the underdrive centrifugal weights on the spring pressure plate. The innermost and outermost positions and four intermediate positions of a weight are shown with corresponding positions of a cam end of the weight. The table of figures gives the spring length for each position of the weight, the corresponding spring stress, and the R. P. M. at which the weights will furnish the said stresses thru the several leverages shown.
Fig. 11 is a curve chart plotted from Fig. 10 showing the possible engine power at any speed and what portion of the possible power may be applied at a given speed when in direct drive without forcing the mechanism into gear drive. It also shows by comparison the difference in result obtainable when centrifugal force is applied thru a constantly diminishing leverage as compared with direct application.

The driven friction clutch member 92 has internal clutch teeth 94 (see Figs. 1 and 5) and a forwardly extending hub 96 (see Figs. 8 and 9) which fits over the outer rim of the carrier 84 and is secured thereto by rivets 98, Fig. 9. The hub 96 is completely cut away at four places as at 97, Fig. 5, to admit the planet pinions 90. The four studs 86 have their outer ends secured in the member 92 whereby said studs have support at both ends.

A series of driven clutch plates 100 (see Fig. 5) have external teeth 102 fitting slidably between the internal teeth 94 of the member 92. A series of driving clutch plates 104 lie between the driven clutch plates and have internal teeth 106 fitting slidably between the external teeth 68 of the ring gear 64 (see Fig. 5). The outer driven clutch plates 108 are thicker than the remaining driven clutch plates 100. An internal spring ring 110 is sprung into a groove in the inside of the rim of the driven clutch member 92. This clutch may be called the underdrive clutch and may be broadly designated by the numeral 111.

Figures 1, 2, 3, 4, 20:
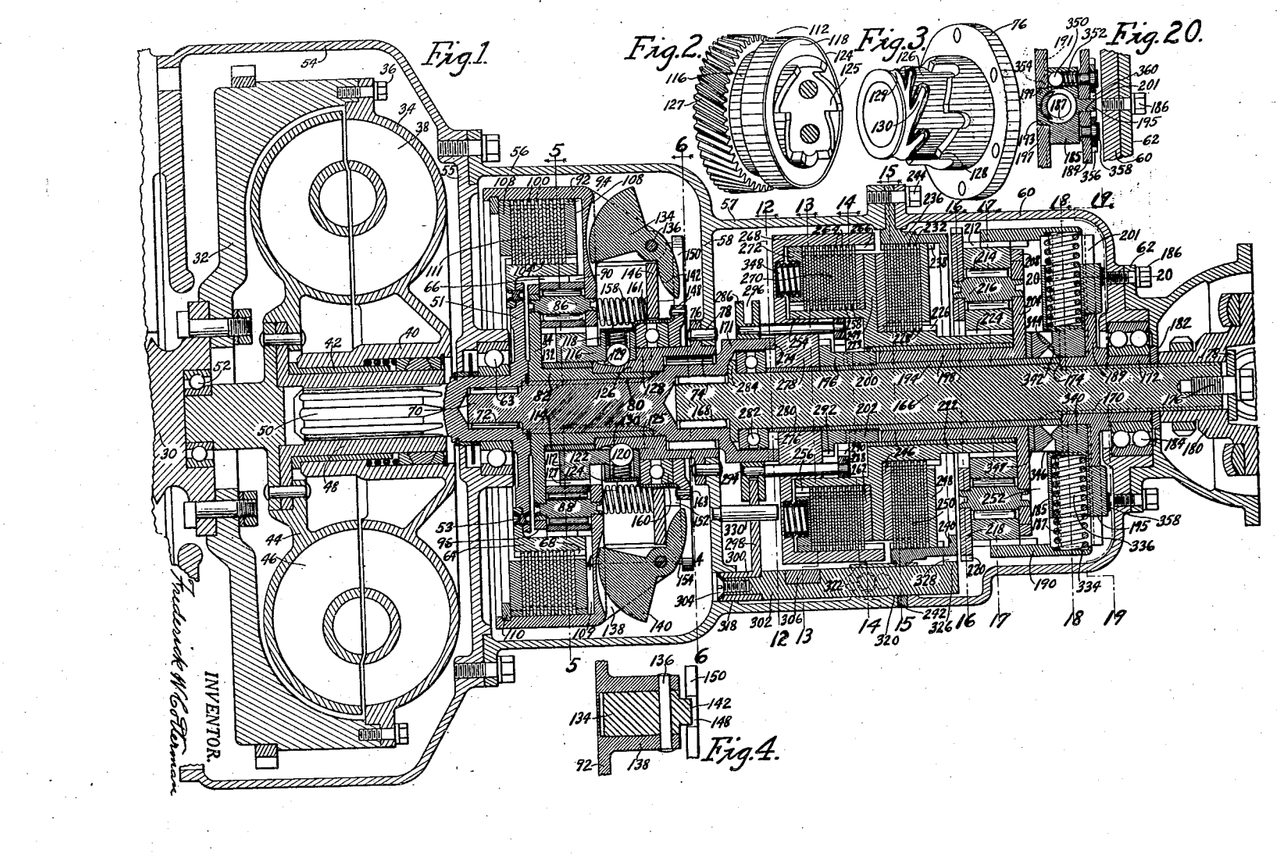
Fig. 1 is a longitudinal, horizontal, axial section thru the complete mechanism.
Fig. 2 is a perspective view of the helical sun gear of the underdrive gear-set, showing also the jaw clutch teeth on the end, which, when effective, secure the sun gear against backward rotation.
Fig. 3 is a perspective view of a member which is secured to the housing of the underdrive gear-set and which has jaw clutch teeth which engage the jaw clutch teeth on the sun gear shown in Fig. 2.
Fig. 4 is a fragmentary section taken at 4—4 of Fig. 1 thru a hinge pin of one of the centrifugal weights which provide force for stressing the resilient means which maintains underdrive clutch engagement.
Fig. 20 is a fragmentary section taken at 20—20 of Fig. 1 thru an overdrive centrifugal weight and spring showing a detent mechanism for holding the weight in its outward position until the speed has dropped a predetermined amount.
Figure 5:
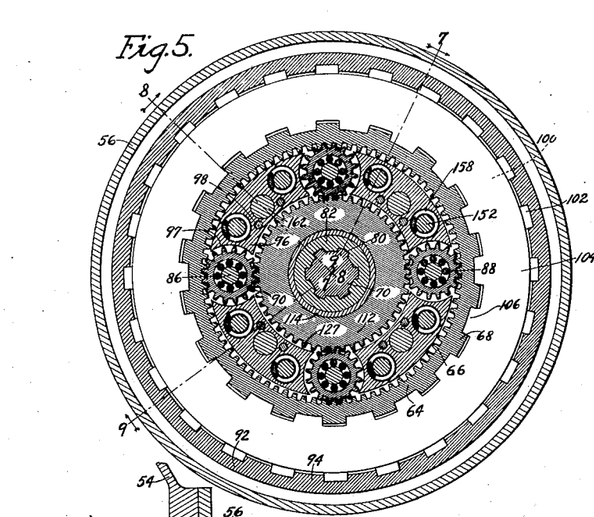
Fig. 5 is a transverse section taken thru Fig. 1 at 5—5 showing the planetary underdrive gear-set surrounded by the plates of the underdrive clutch which prevents operation of the gears when it is engaged.

The sun gear 112, shown in detail in Fig. 2, is rotatable on a bronze bearing bushing 114 which is press fitted over the outside of the internally splined carrier hub 82. An integral hub 116 extends rearwardly from the sun gear and is enlarged at 118 to provide a place for openings to contain the balls 120 and springs 122 (see Fig. 1). A band 124 surrounds the hub to retain the springs in place. The extreme rear end of the hub is formed to compose jaw clutch teeth 125.

Formed integrally around the hub portion 126 of the bearing cage 76 and extending forwardly (see Figs. 1 and 3) are the jaw clutch teeth 128 which correspond to and are engageable with the jaw clutch teeth 125 of the sun gear. The hub 126 extends into the space left between the inside diameter of the sun gear and the smaller end of the carrier hub 82.

The teeth 127 of the sun gear are helical and are at such an angle that any tangential load carried by the teeth creates an axial thrust in the proper direction to effect engagement of the jaw teeth 125 of the sun gear 112 with the jaw teeth 128 of the bearing cage 76.

Near the forward end of the hub 126 a round bottomed groove 129 extends completely around it. From this circular groove at equally spaced points around it the other round bottomed grooves extend rearwardly and somewhat helically, forming the guideways 130 within which the balls 120 act as followers which may move to carry the sun gear 112 rearwardly on the hub 126. The guideways 130 are slightly deeper at the rear end than they are where they join with the groove 129 so that the pressure on the balls creates a tendency to cause the gear to move rearwardly.

Fig. 1 shows the sun gear 112 when it is moved rearwardly as far as it will go with its jaw clutch teeth 125 fully meshed with the jaw clutch teeth 128 carried by the bearing cage 76, and with the balls 120 at the rearward and deepest end of the guideways 130. In this position the sun gear is held against backward rotation as it must necessarily be held to provide gear drive. The sun gear may, however, move forwardly on the hub 82 into the space 132 by drawing the balls 120 forwardly with it into the circular groove 129 whereupon the sun gear is free to rotate forwardly as it must during direct drive. The weight of the balls 120 and the strength of the springs 122 is preferably such that the centrifugal force of the balls becomes greater than the strength of the springs when the sun gear rotates as much as 600 R. P. M. This proportion will allow ample pressure on the balls inasmuch as the only time the balls need become operative as followers to press downward in the guideways and guide the jaw clutch into engagement is when the sun gear 112 has come to a dead stop and starts rotating backwardly.

The balls 120, therefore, never exert any friction on the groove 129 or the guideways 130 except for perhaps a fraction of a second each time the change from direct drive to gear drive and vice versa is taking place. As soon as the sun gear rotates forwardly in direct drive the balls raise up out of contact with the guideways and groove.

The guideways 130 are so located with respect to the teeth 128, and balls 120 are so located with respect to the teeth 125 that whenever the balls follow the helical paths the mating clutch teeth approach each other in proper relation for full depth engagement. This is important, for when a jaw clutch is employed and permitted to engage without such guiding means it frequently happens that the mating teeth engage with a very shallow hold thus throwing an excessive strain on the points of the teeth which results usually in the engaged teeth slipping off and creating a jerk in the carrying of the load.

The eight sector shaped centrifugal clutch operating weights 134 are each hinged by a pin 136 between a pair of ears 138 extending rearwardly from the friction clutch member 92. Two lateral projections 140 (see Figs. 6 and 7) extend from each weight 134 and rest upon the outer edges of the ears 138 and limit inward swinging of the weight on its hinge pin. Formed integral with each weight 134 at the back of the hinge is a cam 142 adapted to be operated by the swinging of the weight about its hinge pin. When the weights are swung to their innermost position, that is, with the projections 140 resting on the edges of the ears 138, the heel of the cam 142 rests on a spring pressure plate 146, (see Figs. 1, 7, and 8).

Figure 6:
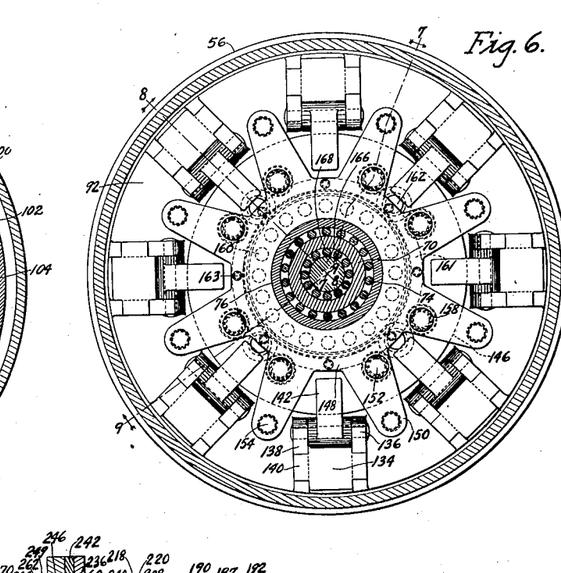
Fig. 6 is a transverse section taken thru Fig. 1 at 6—6 showing, largely in end elevation, the centrifugal weights and the spring pressure plate and clutch engaging spider thru which the weights act to operate the underdrive clutch.
Figures 7, 21:
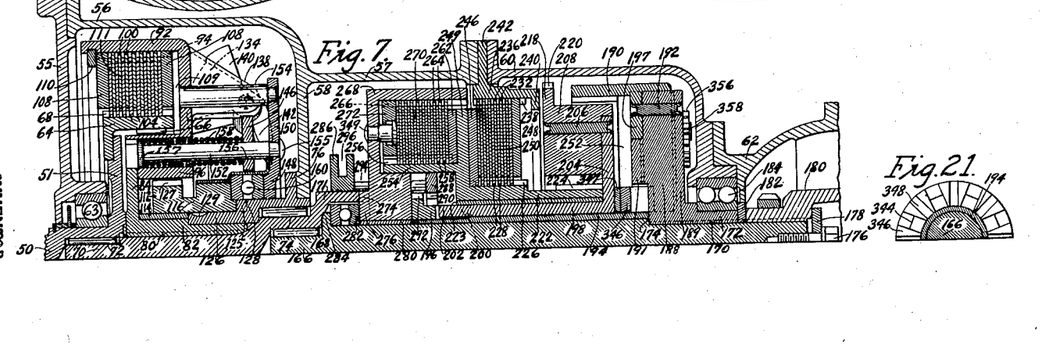
Fig. 7 is a partial longitudinal section, taken on the line 7—7, thru Figs. 5, 6, 12, 13, 14, 15, 16, 17, 18, and 19. It shows, in the underdrive mechanism, the clutch, the resilient means for engaging it, the sun gear in position for overcoming the resilient means and maintaining clutch disengagement and one of the weights for varying the resilient means. In the overdrive mechanism it shows the manually shiftable means for selecting backward or forward vehicle movement, the friction clutch and brake for rotating or stopping the overdrive sun gear, the construction of the overdrive planet pinion carrier and the driven or ring gear carrying member.
Fig. 21 is a partial detail end view of a thrust collar operative in engaging the overdrive clutch.

Slightly rearward of the spring pressure plate 146 is the clutch engaging spider 148 having eight radial arms 150 (see Fig. 6). Each arm 150 (see Fig. 7) has forwardly extending therefrom a clutch spring stud 152 and a clutch engaging stud 154. The clutch spring studs are secured in the spider 148 by riveting at 155 and are slidable thru the spring pressure plate 146, the free ends having heads 157. The clutch springs 158 are held in a substantial initial compression between the heads 157 and the spring pressure plate 146.

The clutch engaging studs 154 are riveted at the rear end in the arms 150, the free end being slidable thru openings in the driven clutch member 92. It will be seen that the stress of the springs constantly urges the weights to their "in" position and at the same time urges the clutch engaging studs 154 forwardly in a direction of clutch engagement. This forward movement is overcome and clutch engagement prevented only by rearward thrust of the helical sun gear when gear drive is in effect. This rearward thrust acts thru the clutch throw-out bearing 160 which is held to the clutch engaging spider 148 by a sheet metal cap 161 (see (Fig. 1) secured by rivets 163, thereby holding the clutch engaging spider 148 to its rearward position shown, whereby the clutch engaging studs 154 are held away from the clutch plates 100 and 104. The clutch is thus held in a fully disengaged position as long as gear drive is in effect.

In the drawings (see Fig. 7) the underdrive gear mechanism is shown in gear drive, in which case the clutch engaging studs 154 are drawn away from the clutch plate 108 leaving the space 109 into which the plates 100 and 104 may spread. The space 109 becomes wider as the clutch plates wear thinner but provision is made whereby the clutch engaging spider 148 may be moved enough farther by the springs 158 to compensate for such wear as may occur within the life of a motor vehicle whereby no manual clutch adjustment is ever required.

As the speed of the vehicle movement rises and falls the weights 134 move outwardly and inwardly thereby moving the spring pressure plate forwardly and rearwardly thus increasing and decreasing the stress of the springs 158. This changing in spring stress takes place with change in the rate of vehicle movement whether gear drive or direct drive is then in effect. But anytime during gear drive that the speed rises high enough to stress the springs an amount greater than the then existing load is thrusting the sun gear rearwardly, the clutch engaging spider is drawn forward against the sun gear resistance and direct drive will be established. To insure that the weights will move in and out simultaneously, the spring pressure plate is provided with four guide pins 162 (see Fig. 8) which are slidably fitted into openings 164 in the hub 96 of the driven clutch member 92. This prevents any one weight from moving outwardly ahead of the others and thereby creating an unbalanced effect.

In any speed-torque controlled transmission, gear-drive may be made effective below certain speeds by applying engine power sufficient to slip the direct drive clutch. Now inasmuch as the direct drive clutch is maintained in engagement by the force of centrifugal weights which increase their force as the square of the vehicle speed, it follows that where weights are kept small enough to permit gear drive to be brought back into play at speeds above say 30 M. P. H. by application of full engine power, then only one fourth full engine power may be applied at 15 M. P. H. without slipping the clutch and effecting gear drive.

It is, however, more desirable to provide a mechanism wherein gear drive may be brought into play at 30 M. P. H. by application of full engine power, but wherein at least two thirds full engine power may be applied at 15 M. P. H. without reverting to gear drive. This is desirable to permit lower speeds to be effected in direct drive without having the mechanism shift into gear drive when only a reasonable amount of power is being applied.

Conversely it is desirable when in gear drive and acceleration has proceeded until 10 to 15 M. P. H. has been attained, to have the mechanism to change to direct drive at that speed, if the operator, by applying only moderate power, indicates no desire for maximum acceleration. But in conventional speed-torque mechanisms, there is far too little weight force at these low speeds to cause a shift to direct drive and the mechanism remains in gear drive even tho only moderate power is being applied and direct drive would be more desirable.

In the underdrive mechanism herein shown the weights 134 are made large enough to provide the desired clutch engaging pressure when they are rotating at the lower speeds, then, in order to prevent these weights from applying too great a clutch engaging pressure at the higher speeds, the leverage thru which the weights 134 act on the springs 158 is progressively decreased as the speed of rotation of the weights increase. This result is obtained by first positioning the weights 134 with their centers of gravity considerably farther from the transmission axis than their hinge pins 136 when the weights are clear in, and second, by constructing the work arm in the form of the cam 142 the heel of which rests against the spring pressure plate 146 when the weights are clear in and the toe of which rests against the spring pressure plate when the weights are clear out.

Fig. 10 shows diagrammatically the movement of the center of gravity of a weight 134 and the corresponding movements of a cam 142. The point $a$ represents the center of gravity of a weight 134 when it is swung to the "in" position, the point $f$ represents the center of gravity when it is swung to the "out" position, and the points $b$, $c$, $d$, and $e$ represent intermediate positions. The points $g$, $h$, $i$, $j$, and $l$ represent the positions of the centers of the arcuate working face of the cam 142 corresponding to the several weight positions, that is, when the center of gravity of a weight is at $a$, the center of the arcuate face of the cam is at $g$; when the center of gravity of the weight is at $b$, the center of the arcuate face of the cam is at $h$ etc. The lines $m$, $n$, $o$, $p$, $q$, and $r$ represent the positions to which the spring pressure plate 146 has been moved when the center of the arcuate face of the cam has moved to position $g$, $h$, $i$, $j$, $k$, and $l$ respectively.

From the diagram it will be seen that when the center of gravity of a weight is at $a$ it is 3.797" from the transmission axis about which it rotates, and that it applies its centrifugal force to the spring pressure plate 146 thru a lever the power arm of which is .730" and the work arm of which is .375" while when the center of gravity of the weight is, for instance, in the position $e$, it is 4.169" from the transmission axis about which it rotates, and it applies its centrifugal force to the spring pressure plate 146 thru a lever the power arm of which is .285" and the work arm of which is 1.007". A given force applied by the weight to the spring pressure plate when the weight is clear out is only about $1/14$ as effective as the same force would be if applied when the weight was clear in.

The columns of numerical values at the lower end of the diagram Fig. 10 give, from left to right, first the movement of the spring compressing plate caused by weight movement to $b$, $c$, $d$, $e$, and $f$; 2nd, the length to which this movement compresses the springs if the mechanism is in direct drive; 3rd, the length to which the movement compresses the springs if the mechanism is in gear drive; 4th and 5th, the forces required to compress the springs to the lengths given in columns 2 and 3 respectively; and 6th and 7th, the R. P. M. which the weights must make about the transmission axis at their respective distances therefrom to create the required spring compressing forces thru the leverages in effect at the respective positions.

Fig. 11 is a curve chart wherein the curve $s$ is plotted from the numerical values in columns 5 and 7 in Fig. 10 and the curve $t$ is plotted from the numerical values found in columns 4 and 6. The curve $u$ is plotted to increase as the square of the R. P. M. and indicates the pounds force which centrifugal weights would apply to maintain clutch engagement if applied in the usual manner without changing the leverage thru which the weights act. By curve $s$ it may be found that when the underdrive gear-set is in gear drive and the vehicle speed is 10 M. P. H., the weights will be revolving 600 R. P. M. and will be stressing the springs with a force of about 120 pounds and that at this speed the engine must apply a force of as much as 60 out of a possible 170 foot pounds torque to the gears (see values at left of chart), in order to create a rearward sun gear thrust of 120 pounds and thereby maintain equilibrium.

It follows that if, at 10 M. P. H. in gear drive, slightly less than 60 foot pounds torque is applied to the gearing by the engine, a shift up to direct drive will take place. By the lower curve $u$ it may be seen that the application of power to a conventional speed-torque mechanism would have to be reduced to something less than 6 foot pounds to compel the mechanism to remain in direct drive at 10 M. P. H. The result is that, with conventional speed-torque mechanisms, a shift up to the direct drive connection would not likely ever be had at 10 M. P. H. because of the great reduction in applied torque required to cause such a shift up. Such shift up might, however, be had at 10 M. P. H. with conventional mechanism when driving on a considerable down grade.

The same curve $s$ shows that if, when in gear drive, the vehicle is moving 25 M. P. H., the weights will be revolving 1500 R. P. M. and that the weights will have stressed the springs with a force of about 202 pounds and that the engine must apply a torque of as much as 101 out of a possible 170 foot pounds to create a rearward sun gear thrust of 202 pounds to maintain equilibrium and thereby maintain direct drive. It follows that at 25 M. P. H. in gear drive any reduction in applied torque to less than 101 foot pounds would bring the sun gear thrust to less than 202 pounds and permit the force of 202 pounds which was being applied to the springs by the weights to cause a shift up to direct drive.

Now the capacity of the underdrive clutch must be such that when it is engaged with a pressure of as much as 200 pounds (see values to right of chart) it will carry the maximum torque input for which the mechanism is designed, namely 170 foot pounds. By curve $t$ it may be seen that if direct drive is in effect and the vehicle is moving 25 M. P. H. the weights will be revolving 1500 R. P. M. and stressing the springs with a force of 184 pounds and that in order to slip the clutch and bring in gear drive it will be necessary to apply about 157 foot pounds torque.

From the above it will be seen that, at a vehicle speed of 25 M. P. H. in gear drive, a reduction in torque application to less than 101 foot pounds is necessary to cause a shift up to direct drive, but if the vehicle maintains this speed of 25 M. P. H. after it has changed to direct drive there must be applied a torque of 156 foot pounds to restore gear drive. This overlap is provided so that too slight changes in torque application will not continually shift from gear drive to direct drive and vice versa and thereby cause undue clutch wear.

The curve $v$ represents the maximum in foot pounds torque which may be delivered to the drive shaft 50 by a 90 H. P. engine at the various drive shaft speeds. By comparing the curve $v$ with the curves $s$ and $t$ the percentage of maximum power which must be applied at any speed to prevent a change from gear drive to direct drive and which may be applied at any speed without causing a change from direct drive to gear drive may be seen.

From the curve $v$ it may be seen that the maximum engine torque of 170 foot pounds may be applied to the drive shaft 50 when it is rotating as slowly as 450 R. P. M. which, in gear drive, is at a vehicle speed of 5 M. P. H. This is true, however, only where, as in this case, a fluid coupling is used to connect the engine to the drive shaft, because while the drive shaft may be rotating only 450 R. P. M., the engine due to the slippage in the fluid coupling has raced ahead to about 1900 R. P. M. at which speed the engine is able to deliver its maximum torque.

Had a friction clutch been employed instead of a fluid coupling, the maximum torque deliverable at 5 M. P. H. vehicle speed would have been about 132 foot pounds as seen by the dot and dash curve $w$. The curve $w$ is plotted to indicate the torque deliverable by the engine to the shaft 50 when they are coupled together without slippage and are therefore rotating in unison. This is the reason why, with a fluid coupling, the lowest gear speed may comprise an engine-to-wheel ratio of 8 to 1 while where a friction clutch is employed in the same situation, an engine-to-wheel ratio of as much as 11 to 1 is more desirable for the lowest gear speed.

The curve $w$ then actually indicates the maximum torque of the engine when it revolves at the speeds indicated by the figures along the upper edge of the chart which are the speeds required when in gear drive to give the M. P. H. at the extreme bottom of the chart. When, however, the direct drive is in effect, the R. P. M. of shaft 50 for a given M. P. H. will be less, as indicated by the figures along the lower edge of the chart.

It is therefore necessary when consulting the chart to ascertain the maximum torque deliverable to shaft 50 when gear drive is in effect to follow the curve $v$ thru $y$, but when ascertaining the maximum torque deliverable to shaft 50 in direct drive to follow the curve $v$ thru $x$. This is true for the reason that $y$ is plotted by the figures at the upper edge of the chart while $x$ is plotted by the figures at the lower edge. By consideration of these curves it will be seen that the curve $y$, by the upper figures begins to fall at 2200 R. P. M. and $x$ by the lower figures also begins to fall at this same speed, that is, the torque which the engine can deliver falls off after an engine R. P. M. of more than 2200 whether the mechanism is in gear drive or direct drive.

The intermediate shaft 70 which serves both as the driven shaft of the underdrive gear-set and the driving shaft of the overdrive gear-set has integral therewith at its rear end the cup 171. Different members and combinations of members are connected to or disconnected from the cup 171 to provide forward direct drive, forward overdrive, neutral, and reverse.

In a planetary gear train of the type shown comprising the three main elements, that is, the ring gear usually designated as R, the planet pinion carrier designated as C, and the sun gear designated as S, it is well known that:

(1) If S is held against rotation, R is made the driver and C is made the driven, as is the case in the underdrive gear-set hereinbefore described, a reduction in speed will be provided.

(2) That if S is held against rotation, C is made the driver and R the driven an increase in speed will be provided.

(3) That if any two members such as S and C are both made drivers while R is made the driven, a direct drive will be provided.

(4) That if C is held against rotation while S is made the driver and R the driven, R will rotate in the reverse direction.

(5) That if S only is made the driver while R is the driven and C is left wholly free, C will run idle slowly forward and no driving connection will be had between the driving and driven members.

The underdrive gear-set hereinbefore described employs the first of the above connections, while the mechanism now to be described makes all of the remaining connections, that is, 2 to 5, some manually, and some automatically, manual means being provided to elect between allowing the vehicle to stand still, moving it forwardly, or moving it rearwardly, while automatic means are provided to change from direct-forward to overdrive-forward and vice versa at predetermined speeds.

The driven shaft 166, carrying the direct drive, overdrive and reversing mechanism contained in the housing part 57 rearward of the partition 58 and in the shell 60 is rotatably supported at the front end in roller bearing 168 held in the end of the shaft 70. At the rear end the shaft 166 has external splines 170. Closely fitted over these splines is an internally splined hub 172. Hub 172 is drawn against the shoulder 174 of the shaft by the screw 176 thru intermediate members 178, 180, and 182 and the ball bearing 184 which is the type capable of carrying radial load and axial thrust in both directions. The ball bearing 184 is held in place between the shell 60 and the ball bearing cap 62 by the screws 186.

Figures 16, 17, 18, 19:
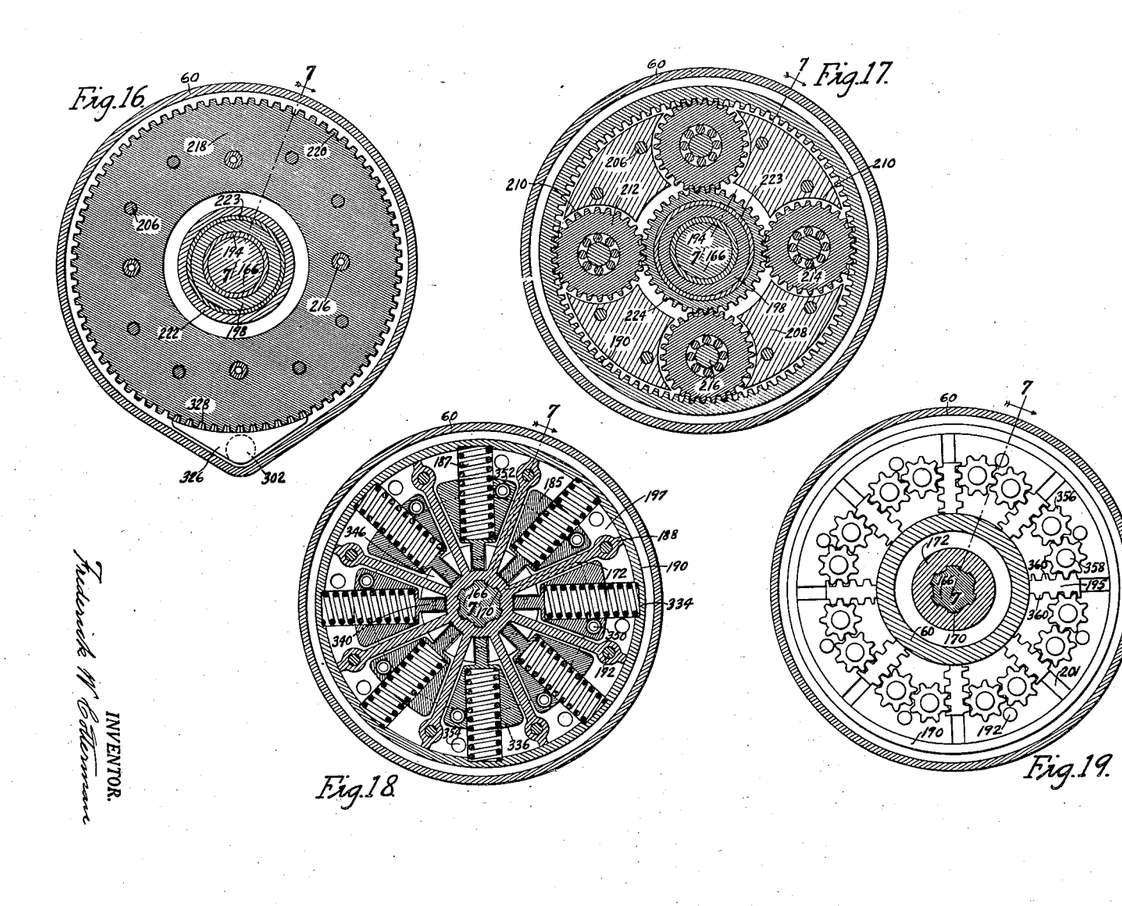
Fig. 16 is a transverse section taken at 16—16 of Fig. 1 showing the flange of the reversing mechanism and the member which may be selectively made to engage it for reversing the vehicle.
Fig. 17 is a transverse section taken at 17—17 of Fig. 1 showing the overdrive gearing.
Fig. 18 is a transverse section taken at 18—18 of Fig. 1 showing the centrifugal weights which are operative above a predetermined speed to overcome the springs which maintain the direct drive clutch in engagement.
Fig. 19 is a transverse section taken at 19—19 of Fig. 1 showing, mostly in end elevation, the mechanism for compelling all of the centrifugal weights of the overdrive mechanism to move out simultaneously.

Hub 172 has eight spokes 188 (see Figs. 7 and 18), extending forwardly from a web 189. This web extends all the way to the outer edges of the spokes. Another smaller web 191 (see Fig. 7), is integral with the forward edges of the spokes midway of their length. The centrifugal weights 185 and springs 187 which control the change from direct drive to overdrive are contained between the webs and spokes, the weights having guide portions 193 and 195 which are slidable in radial slots 199 and 201 in the webs (see Fig. 20). A ring gear 190 closely surrounds the outer ends of the spokes. The ring gear has eight lugs 197 (see Fig. 7) which extend radially inward from its inner diameter. Rivets 192 extend thru these lugs and thru the spokes to secure the ring gear to the spokes, thereby permanently securing the ring gear 190 for rotation with the driven shaft 166.

Rotatable about the shaft 166 is a long bronze sleeve 194 the rear end of which rests against the front face of the hub 172. The forward end is reduced in diameter and on this reduced portion is press fitted a manually engageable clutch member 196. Slidably fitted around the sleeve 194 is the long hub 198 of the planet pinion carrier. The forward end of the hub 198 and the rearward end of the driving member 196 are drivably connected by end splines 200 and 202 respectively (see Figs. 1 and 14). The end splines 200 and 202 enter each other to considerable depth and are slidably fitted whereby the carrier hub 198 has limited sliding movement axially over sleeve 194 without losing its driving connection with the driving member 196.

At the rear end of the carrier hub 198 an integral flange 204 extends outwardly. Secured around and to the forward face of this flange by the rivets 206 (see Fig. 7) is the carrier ring 208. This carrier ring is completely cut away at four places 210 (see Fig. 17) to make room for the planet pinions 212 which are rotatably mounted on roller bearings 214 which run on studs 216 having one end secured in the flange 204 and the other end in the ring 208. A flange 218 extends outwardly at the forward face of the ring 208 and has external clutch teeth 220 around its periphery.

The sun gear hub 222, which has press fitted into it a bronze bushing 223 rotates freely on the carrier hub 198. At the rearward end of the hub 222 the toothed sun gear 224 is formed. The planet pinion studs 216 are so located that the planet pinions 212 are in constant mesh with both the ring gear 190 and the sun gear 224. The teeth of the sun gear 224 are helical, the helix angle being left hand. The purpose of the helical teeth is both to provide quiet running and to create an end thrust proportional to the torque load being transmitted. This end thrust is used to operate the overdrive mechanism in such a manner that an automatic shift to overdrive is made at higher speeds when the torque load being carried is proportionately greater.

Formed integrally around the outside of the sun gear hub 222 are the brake plate driving teeth 226. A series of rotatable plates 228 (see Figs. 1, 7, and 15) have internal teeth 230 which fit slidably over the external teeth 226. A series of non-rotatable plates 232 inserted into the spaces between the first series have external teeth 234. A ring 236 has internal teeth 238 which fit slidably over the external teeth 234.

At its rear edge the ring 236 is flanged inwardly as at 240, and near its front edge it is flanged outwardly as at 242. The flange 242 is held between the housing parts 57 and 60 by the screws 244 whereby the ring 236 together with the plates 232 are permanently held against rotation. The outside rotatable plate 246 and the outside non-rotatable plate 248 are thicker than the other plates of the brake. An integral flange 249 extends outwardly from the forward end of the sun gear hub 222.

This brake may be broadly designated by the numeral 250 and may be called the overdrive brake because when it becomes engaged and holds the sun gear 224 against rotation overdrive is in effect. It is held engaged by the end thrust of the sun gear when said gear is under load, the thrust drawing the flange 249 rearwardly until the plates 228 and 232 are compacted between the flange 249 and 240.

This rearward movement of the sun gear 224 compels the planet pinions 212, the carrier flange 204 and ring 208, and the carrier hub 198 to move with it, whereby the end splines 200 and 202 will be engaged to somewhat less depth than shown in the drawings but still of sufficient depth to maintain driving connection between the driving member 196 and the hub 198. This same rearward movement also partly closes the space 252 and thereby enters the planet pinions 212 more fully into the ring gear 190.

The thickness of the clutch plates 228 and 232 are, when new, such that when they are fully compacted the space 252 is but partly closed, but if they were worn an amount slightly more than usually results in the average life of a motor vehicle they would not be compacted until the space 252 was entirely closed. This arrangement obviates any necessity for adjustment, because as the plates wear, the compacting flange 249 is moved farther axially by the sun gear thrust to effect engagement.

A cylinder 254 extends forwardly from the flange 249 and has external teeth 256 around its periphery. A series of driven clutch plates 258 have internal teeth 260 which fit slidably over the teeth 256. The outer driven plate 262 is heavier than the others. A series of driving clutch plates 264 positioned between the driven clutch plates have external teeth 265 and are fitted slidably between internal teeth 266 of the driving clutch drum 268. The outside driving clutch plate 272 is thicker than the others. This clutch may be called the direct drive clutch because it must be engaged to effect direct drive. It may be broadly designated by the numeral 270.

Figures 12, 13, 14, 15:
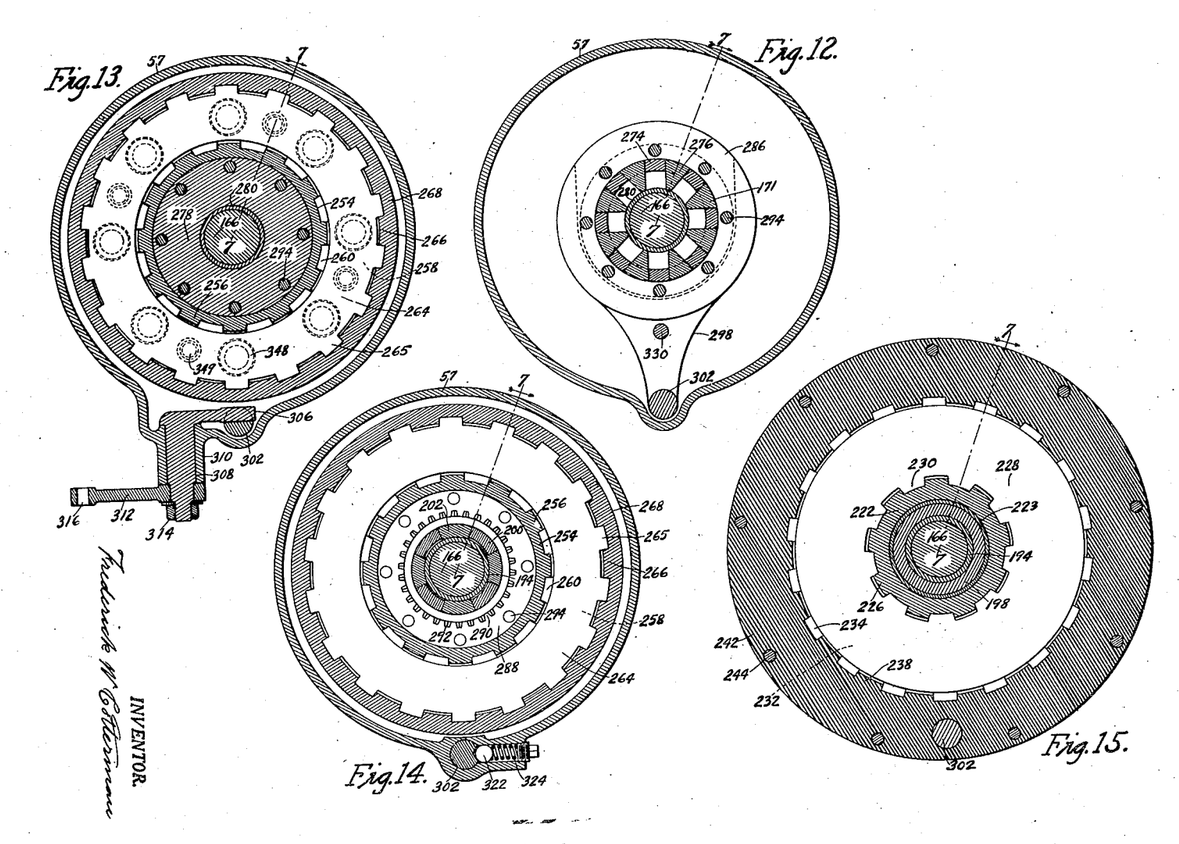
Fig. 12 is a transverse section taken at 12—12 of Fig. 1 showing part of the manually operable forward and reverse selective mechanism.
Fig. 13 is a transverse section taken at 13—13 of Fig. 1 showing another part of the forward and reverse selective mechanism and the plates of the direct drive clutch of the overdrive mechanism.
Fig. 14 is a transverse section taken at 14—14 of Fig. 1 showing portions of the forward and reverse selective mechanism and the detent mechanism therefor.
Fig. 15 is a transverse section taken at 15—15 of Fig. 1 thru the overdrive brake which holds the overdrive sun gear stationary.

The driving clutch drum 268 is made to always rotate in unison with the cup 171 by means of teeth 274 on the rearward end of the cup which extend into the teeth 276 in the forward end of the hub 278 of the driving clutch member 268 (see Fig. 12). These teeth are in permanent engagement. The hub 278 is provided with a bronze bearing bushing 280 runningly fitted to the driven shaft 166. A thrust bearing 282 is interposed between the ends of the teeth 276 and a shoulder 284 on the driven shaft 166, whereby any end thrust due to engagement of clutch 270 will not be transferred to the intermediate shaft 70.

Axially slidable on the outside of the cup 171 is a shifting collar 286. A clutch ring 288 has internal teeth 290 adapted to slide over the external teeth 292 of the clutch member 196. A series of pins 294 extending slidably thru holes in the hub 278 of the driving clutch drum 268 connect the shifting collar 286 with the clutch ring 288.

A groove 296 in collar 286 receives the shifter fork 298 which has a hub 300 secured to the rod 302 by the screw 304. A slot in the side of the rod 302 receives the lower end of a lever 306 which has bearing at 308 in a hub 310 of the housing part 57. A second lever 312 is secured to the outer end of the bearing 308 by a nut 314. Forward and backward movement of the upper end 316 of the lever 312 will move the rod 302 axially in the housing. A "Bowden" wire with push button control on the instrument panel of the vehicle (not shown) or other suitable means may be provided for moving the upper end 316 of the lever 312.

Bearing for the rod 302 is provided in the housing at 318 and 320. A detent ball 322 and spring 324 (see Fig. 14) hold the rod in its several positions. The rear end of the rod has a segment 326 having internal teeth 328 adapted to slide over the teeth 220 of the carrier ring 208 to hold the carrier against rotation. A pin 330 extends from the partition 58 and an opening in the fork 298 is slidable over it, whereby the fork is prevented from frictional contact with the bottom of the groove 296.

The direct drive clutch 270 is never disengaged except when overdrive is in effect. In underdrive, in direct drive forward, in neutral and in reverse it remains engaged as shown in the drawings. This engagement is effected by the eight heavy coil springs 187 (see Figs. 1 and 18) which have the outer ends resting in shallow pockets 334 in the rim of the ring gear 190 and the inner ends in deep pockets 336 in the segmental centrifugal weights 185. When the centrifugal force of the weights becomes sufficiently great the springs yield and the weights move radially outward until they rest against the inner side of the rim of the ring gear 190.

The weights 185 are provided at their inner ends with cam parts 340 having sharp noses 342. Corresponding sharp noses 344 are formed integral with a collar 346 (see Figs. 1 and 21). Radial slots 348 formed in the collar, straddle the spokes 188 whereby the collar is compelled to rotate with the driven shaft 166 and ring gear 190 which also keeps the cam noses 342 and 344 in register. A bronze wear washer 347 is interposed between the collar 346 and the flange 204.

It will be seen that when the weights 185 are moved radially inward by the springs 187, the noses 342 engage the noses 344 and the collar 346 is moved axially forward, moving with it the carrier flange 204, hub 198, sun gear 224, sun gear hub 222, and flange 249 thereby compacting the plates of the direct drive clutch 270 and engaging it as shown in the drawings.

The eight springs 348 yield as clutch 270 is being engaged and thereby permit the noses 342 to snap over the noses 344 as shown. In the engaged condition shown in the drawings, the springs 348 act in conjunction with the springs 187 to prevent the weights 185 from moving radially outward and thereby permitting the overdrive connection to be effected. Four studs 349 (see Figs. 7 and 13) limit expansion of the springs 348. When the plates of clutch 270 are new, the springs 348 will be compressed about as shown, but as the clutch plates wear, the springs 348 will be compressed as much less as the wear. No adjustment for the clutch 270 is therefore provided. The helix angle of the sun gear 224 is such that during direct drive forward it creates a rearward end thrust. This thrust also acts in conjunction with the springs 187 to prevent the change to overdrive. Inasmuch as this thrust varies with the torque being transmitted, a shift to overdrive is delayed somewhat longer when the torque being transmitted is greater.

In one side of each weight 185 an opening contains a detent ball 350 and spring 352 which seats the ball in a pocket 354, when the weight is clear out thereby to detain the weights in the "out" position when they are once out until a substantial reduction in speed is had. A series of small gears 356, preferably punched from one eighth inch sheet metal are rotatable on studs 358, and are in mesh with each other and with rack teeth 360 cut integral with the guide part 195 of the weights (see Figs. 19 and 20). These small gears and racks insure that no one weight may move radially without movement of all of the weights being effected, whereby unbalancing of the mechanism by one weight moving in advance of the others is prevented.

*Proportion*

While the transmission shown may be designed for an engine of any ordinary horsepower some indication of the proportion for a given horsepower may preferably be set forth.

With an engine of 85 to 90 H. P. at 3800 to 4200 R. P. M. and a total vehicle weight of around 2600 to 2900 lbs. the proportion of most of the parts may be gotten by taking the outside diameter of the driven clutch member 92 as 9⅜ inches and making all other parts of the mechanism to the same scale. Some of the dimensions which may not readily be gotten by scaling the drawings are as follows:

The helix angle of the underdrive gear-set should be 23 degrees. The ring gear should have a pitch diameter of 5.432 inches and have 80 teeth; the sun gear a pitch diameter of 3.259 inches and have 48 teeth; and the planet pinions a pitch diameter of 1.086 inches and have 16 teeth.

When the sun gear is held against rotation, the ring gear is the driver, and the planet pinion carrier is driven, one revolution of the driven carrier C may be produced by $$\frac{R+S}{R}$$

revolutions of the driver R. The underdrive ring gear must therefore revolve $$\frac{80+48}{80}=\frac{16}{10}$$

or 1.6 revolutions to produce 1 revolution of the carrier.

In planetary gearing of the type herein employed the ratio available is confined within narrow limits, being always less than 2 to 1 and more than 1 to 1, the practical limit being reached at about 1.75 to 1 for most and 1.25 to 1 for least reduction. A ratio of 2 to 1 would be obtainable only were it possible to make the diameter of the sun gear and ring gear equal, which would make the planet pinions zero diameter, while the ratio of 1 to 1 would be obtainable only were it possible to make the planets half the ring gear diameter which would require a sun gear of zero diameter.

The underdrive gear-set selected herein is therefore near the practical limit of reduction. This reduction would be insufficient if this gear-set were used with an ordinary flywheel friction clutch, but with the fluid coupling it is ample for the reason that the fluid coupling permits the engine to speed up to its best torque producing speed while the vehicle speed is still very low. The combination of this type of underdrive gear-set with a fluid coupling in therefore considered as a valuable feature of the invention.

The eight sector shaped weights 134 should together weight about 2.62 lbs. exclusive of the hinge part. The springs 158 should be made of .080 inch round wire coiled ½ inch pitch diameter, each have 17 turns and a free length of 2.634 inches. The small springs 122 should be of 1/32 inch round wire coiled to ⅜ inch pitch diameter, have 4 turns and a free length of ½ inch.

The helix angle of the overdrive gear-set should be 30 degrees. The ring gear should have a pitch diameter of 6.351 inches and have 88 teeth; the sun gear a pitch diameter of 2.598 inches and have 36 teeth; and the planet pinions a pitch diameter of 1.876 inches and have 26 teeth.

When reversing is to be done with a gear-set of this character, the sun gear is made the driver and the carrier is held against rotation, the ring gear being the driven member. The rule in this case is, one revolution of the sun gear produces $$\frac{S}{R}$$

revolutions of the ring gear backwardly. The overdrive gear-set will then, when used for reversing, provide a reverse ratio of $$\frac{36}{88}$$

that is, the sun gear must rotate 2.444 turns forwardly to rotate the ring gear one turn backwardly.

When the sun gear only is connected to the driving member and the ring gear is to be non-rotatable, and the carrier is left to rotate idly, as is the case when the herein described mechanism is in the neutral position shown in the drawings, the rule for ratio is, one revolution of the sun gear will produce $$\frac{S}{R+S}$$

revolutions of the carrier, that is, if the carrier is left loose, and the ring gear resists rotation, the carrier will idle slowly forward at $$\frac{36}{88+36}=\frac{9}{31}$$

revolution to each revolution of the sun gear, that is, the sun gear must rotate 3.444 turns to cause the carrier to idle one turn.

When overdrive is to be made effective the sun gear is held against rotation while the planet pinion carrier is made the driver. The rule in such a case is, one revolution of the carrier produces $$\frac{R+S}{R}$$

revolutions of the ring gear. The overdrive ratio then is $$\frac{88+36}{88}=\frac{31}{22}$$

that is, one revolution of the driving carrier will produce 1.409 revolutions of the driven ring gear.

The eight segmental weights 185 should together weigh 1.6 lbs. The springs 187 should be of ⅛ inch round wire coiled to ⅝ inch pitch diameter, each have 10 turns and a free length of 2.525 inches. The springs 352 should be of 1/16 inch round wire coiled ¼ inch pitch diameter, each have 4 turns and a free length of ½ inch. The springs 348 should be coiled of 3/32 inch round wire coiled ⅝ inch pitch diameter, each spring has 4 turns and a free length of .765 inch.

A transmission proportioned as shown and used with the power and vehicle weight indicated should be used in conjunction with a rear axle having a ratio of 5 to 1. This will provide engine-to-wheel ratios of 8 to 1 for underdrive, 5 to 1 for direct drive, and 3.548 to 1 for overdrive.

According to present practice the 8 to 1 ratio for low speed would be considered insufficient, but when coupled with a fluid coupling instead of a clutch this is ample reduction due to the fact that the engine slips the coupling and therefore almost instantly rises to its best torque point. The fact is that with a fluid coupling more torque may be applied to the wheels with an 8 to 1 ratio at 0 to 10 M. P. H. than may be applied with a ratio of 10 or 11 to 1 when an ordinary flywheel clutch is used.

The matter of the relative proportion of the clutches 111 and 270, and brake 250 should be noticed. The mechanism shown is proportioned for 170 foot pounds input. This 170 foot pounds, after being transmitted thru the underdrive gears becomes 1.6 × 170 or 272 foot pounds at the cup member 171. Now if the clutch 270 had to transmit 272 foot pounds it would ordinarily have to be larger than the clutch 111. But the clutch 270 is required only to prevent the sun gear 224 from rotating forwardly faster than the carrier 204, and the brake 250 is required only to prevent the sun gear 224 from rotating forwardly faster than zero revolutions.

Now if the vehicle were locked against movement, and the carrier 204 was driven forwardly with a force of 272 foot pounds, so as to force the sun gear 224 to revolve forwardly and thereby slip the clutch 270, the sun gear would have to revolve forwardly carrying the clutch plates 258 with it at a speed of $$\frac{R+S}{S}=\frac{88+36}{36}=\frac{31}{9}$$

revolutions of the sun gear forwardly to 1 revolution of the carrier. It follows that the clutch 270 need only be of a size which will transmit 9/31 of 272 foot pounds or 79 foot pounds. This is also the maximum which can be imposed on the brake 250.

The clutch 270 proportioned as shown will transmit 79 foot pounds when a minimum axial pressure of 177 pounds is applied to its discs. The springs 348 when proportioned as indicated will apply one and one half times the above minimum or 266 pounds to maintain engagement.

The brake 250 is proportioned so that the helix angle of 30 degrees specified for the sun gear 224 will create substantially double the axial pressure required to keep the clutch from becoming slipped by the tangential load on the sun gear when the thrust is allowed to engage the brake 250 upon disengagement of the clutch 270.

*Operation*

The operation of the herein described mechanism may be carried out as follows:

The top end 316 of the lever 312 should first be placed in the midway position shown in the drawings whereby the clutch teeth 290 are disengaged from the clutch teeth 292 and the carrier 204 is free to rotate idly. The underdrive clutch 111 and the direct drive clutch 270 being both normally engaged, the sun gear 224 is connected to rotate at the same speed as the shafts 50 and 70. In this state the engine may be started and raced to warm it if desired, without moving the vehicle, because the rotating sun gear 224 and non-rotating ring gear 190 will cause the carrier to rotate idly forward at .29 the speed of the shaft 50, that is, the shaft 50 must rotate about 3½ turns to rotate the carrier one turn.

The top end 316 of the lever 312 may now be drawn forward to move the rod 302 rearward to engage the teeth 328 of the segment 326 with the teeth 220 of the carrier ring flange 218. The engine may now be accelerated sufficiently to cause the shaft 50 to be rotated by the engine thru the fluid coupling. The sun gear 224 is still connected thru the clutches 111 and 270 and shaft 70 for rotation at the same speed as shaft 50. The ring gear 190 will therefore be driven backwardly at the rate of one revolution of the ring gear to 2.44 revolutions of the shaft 50. With a 5 to 1 axle the engine to wheel ratio of this reversing connection is, 1 revolution of the wheel to 12.22 revolutions of the shaft 50. If while this reversing connection is in effect, the vehicle encounters a considerable resistance to backward movement, and sufficient engine force is applied to overcome it, the underdrive gear-set may become effective whereupon the ring gear 190 will be driven backwardly one revolution for each 3.91 revolutions of the shaft 50. The engine to wheel ratio in this case would be, 1 revolution of the wheel backwardly to 19.55 revolutions of the shaft 50 forwardly.

It should be noticed that when the sun gear 224 is thus made the driver for reversing the vehicle, the axial thrust of the left hand helical teeth produces a forward thrust of the sun gear, whereby the greater resistance to reversing encountered by the vehicle wheels, the harder the plates of clutch 270 will be compacted. When resistance to reversing is so great as to bring in the underdrive gearing, and thereby reverse thru the high reduction of 19.55 to 1 as above indicated, the plates of clutch 270 will be so compacted as to further compress the springs 348 and allow the end plate 272 to be forced against the end wall of the clutch member 268. This is desirable inasmuch as clutch 270 may be required to carry its greatest load when reversing. The degree to which the plates will be compacted will always be in proportion to the load when reversing if a load heavy enough to flatten down the springs 348 is encountered.

The top end 316 of the lever 312 may now be moved rearward to move the rod 302 forward to engage the clutch teeth 290 of the ring 288 with the teeth 292 of the clutch member 196, and disengage the teeth 328 of the segment 326 from the teeth 220 of the flange 218. Inasmuch as the sun gear 224 is still connected by the direct drive clutch 270 to the shaft 70, the entire rotatable mechanism rearward of the partition 58 must rotate in unison, that is, the direct drive connection is in effect. The 5 to 1 axle now provides an engine-to-wheel ratio of 5 to 1.

At any speed now, while direct drive connection is thus made, that the operator applies to the shaft 50 a torque having a value for that speed, which is above the curve t, Fig. 11, he will slip the clutch 111 and thereby force the underdrive gear-set to become effective, that is, at 10 M. P. H. he may not apply more than 85 foot pounds (see foot pound values at right of Fig. 11), or at 20 M. P. H. he may not apply over 137 foot pounds without slipping the clutch and thereby bringing the underdrive gearing into play. After 30 M. P. H. he may apply the maximum of 170 foot pounds without slipping the clutch and reverting from direct to underdrive.

Since the clutch 111 is normally engaged, the sun gear 112 is rotated forwardly by the ring gear 64 and planet pinions 90 at the same speed as the clutch. But as soon as a torque is applied to the clutch 111 of sufficient value to slip it against the clutch engaging force provided by the weights 134, which is governed by the then existing vehicle speed, the sun gear instantly starts to rotate at less R. P. M. than the clutch. When the clutch slips an amount which permits the ring gear 64 to revolve 1.6 times as fast as the carrier 84, the sun gear will have been brought to a non-rotative state.

At the slightest increase in slip of clutch 111, the sun gear 112 starts to rotate backwardly, whereupon the helical teeth 127 which up to now drew it axially forward into the space 132 now starts it axially rearward. As this occurs the helical teeth 127, the balls 120 and guideways 130 and the jaw clutch teeth 125 and 128 all cooperate to move the sun gear rearwardly and guide the jaw teeth 125 and 128 into correct engagement.

When the jaw teeth engage and the gear load is taken up, the jaw teeth are forced by the load acting on the helical teeth to full depth engagement and thereby, thru the thrust bearing 160, fully disengage the clutch 111 so that there will be no partial engagement and consequent drag.

Any time and at any speed the operator may release the accelerator sufficiently to cause the rearward load created thrust to be less than the forward weight created thrust and thus allow the sun gear to move axially forward about ⅛ inch.

This does not instantly change from underdrive to direct drive because when the sun gear has been pushed forwardly about ⅛ inch, the studs 154 press the friction clutch discs 100 and 104 together. The jaw clutch teeth 125 and 128 being about ¼ inch long are not out of mesh and therefore momentarily continue the gear drive in effect. But the friction between the rubbing clutch discs altho not great at the first touch, nevertheless takes some of the load off of the gearing.

When it takes some of the load off of the gearing the rearward thrust on the sun gear 112 is just that much less, and being less permits more of the clutch engaging pressure of the springs 158 to be applied to the discs, which, rubbing harder, takes more load off of the gearing. This is repeated over a period of several seconds whereupon enough of the spring pressure is applied to the discs to allow the driving discs 104 to revolve more nearly at the same speed as the driven discs 100 than the ratio of 1.6 to 1 of the gears whereupon all of the load is removed from the sun gear 112 and it is rotated clockwise.

As soon as this occurs, the jaw teeth 125 and 128, the guideways 130 and the helical teeth 127 all cooperate to move the sun gear forwardly and completely disengage the jaw teeth. The helical teeth alone will keep them disengaged as long as the sun gear 112 rotates forwardly, which is as long as direct drive is in effect.

Instantly the sun gear rotates forwardly, if the speed has been raised to as much as 10 M. P. H., the followers 120, which have been pressing downwardly in the groove 129 and guideways 130 while the sun gear was non-rotative, now rise against the springs and remove the friction between the followers and the guideways and groove.

It is, however, possible to start from zero M. P. H. and accelerate the vehicle to a high speed without bringing the underdrive gearing in at all, but the torque applied in such a case to shaft 50 at 0 M. P. H. would have to be so low that acceleration would be very slow.

In starting from a dead stop, therefore, the operator will almost invariably apply enough torque to bring in the underdrive gearing. In sections where 15 M. P. H. is the limit of speed, some drivers, in starting from a dead stop may apply maximum torque as indicated by the curve v, Fig. 11, and thereby bring in the underdrive gearing, then accelerate by maximum torque to 15 M. P. H., then reduce the torque to 110 foot pounds or less which would cause a change to direct drive, and thereafter so regulate the applied torque as to keep down to 15 M. P. H. until another stop was required.

In sections where no speed limit is imposed, the driver, starting from a dead stop, may apply full torque as indicated by the curve v to bring in the underdrive gearing, then keep the torque at the highest possible value. After a speed of 2200 R. P. M. of the engine, the maximum torque will decrease as seen in the curve y. At 3840 R. P. M. of the engine or 40 M. P. H. in underdrive the torque will have fallen off from 170 to 122 foot pounds.

This 122 foot pounds creates a sun gear thrust of 240 pounds tending to maintain underdrive in effect, (see values at left of Fig. 11). By reference to curve s it will be seen that at 3840 R. P. M. or 40 M. P. H. in underdrive the weights 134 have energized the springs 158 to such an extent that they are providing 240 pounds force tending to engage the clutch 111. Any slight increase in speed above 40 M. P. H., in underdrive, will force a shift to direct drive.

It will therefore be seen that a driver may, in starting from a dead stop, accelerate to a high speed without using underdrive if given sufficient time; he may accelerate to 10 to 15 M. P. H. in underdrive then shift to direct by lowering his applied torque; he may then continue at this speed in direct or accelerate from there upward in direct; or he may by applying maximum torque steadily, accelerate to 40 M. P. H. in underdrive. He cannot, however, maintain underdrive above 40 M. P. H., which is a desirable limitation to prevent engine rushing.

It will also be seen that should the operator be driving, say 20 M. P. H., in direct drive, and desire to change his speed to 40 M. P. H. as soon as possible, he could, by applying torque in excess of 137 foot pounds change to underdrive, then accelerate to 40 M. P. H. in underdrive whereupon the shift to direct would take place. If, however, the vehicle is once moving at a speed of as much as 30 M. P. H. in direct drive, no return to underdrive may be effected except by lowering the speed, because at 30 M. P. H. in direct drive, the weights 134 will energize the springs 156 with a clutch engaging force of 200 pounds (see curve t), and clutch 111 is so designed that when it is held engaged with a force of 200 pounds it will carry the maximum torque of 170 foot pounds (see values at right of Fig. 11). The operator may, therefore, voluntarily bring in underdrive at any speed under 30 M. P. H. and may maintain it up to any speed not to exceed 40 M. P. H. The engine speed of 3840 R. P. M. necessary to bring the vehicle speed to 40 M. P. H. in underdrive is not injurious inasmuch as engines of this class have an operating range up to 5000 R. P. M. When the direct drive clutch 111 engages at 40 M. P. H. the engine will drop in speed from 3840 to 2400 R. P. M. (see values at top and bottom of Fig. 11).

Having thus employed underdrive to overcome unusual resistance, as in accelerating the vehicle, or in climbing an unusual hill, the operator will maintain direct drive for all ordinary driving.

But with the 5 to 1 axle ratio indicated as suitable for use with the herein mechanism the engine would again be revolving 3000 R. P. M. when a speed of 50 M. P. H. is reached in direct drive, 3600 R. P. M. at 60 M. P. H., 4200 R. P. M. at 70 M. P. H., and 4800 R. P. M. at 80 M. P. H., and while it would be possible to drive in direct with these engine speeds it is far more desirable after a speed of 50 M. P. H. has been passed to change to the overdrive mechanism herein shown, in which case a speed of 50 M. P. H. is maintained at 2129 engine R. P. M., 60 M. P. H. at 2555 R. P. M., 70 M. P. H. at 2981 R. P. M., 80 M. P. H. at 3406 R. P. M. and 90 M. P. H. at 3832 R. P. M., the latter engine speed being still within a limit which is not destructive.

Inasmuch as the springs 348 constantly, thru intermediate parts, press the nose 344 of the weight holding collar 346 over the outer surface of the nose 342 of the weights 185, with a force of 266 pounds as before stated, and thereby keep the direct drive clutch 270 engaged, the weights 185 are necessarily so proportioned that they develop 266 pounds more centrifugal force outwardly than the springs 187 exert inwardly, at 50 M. P. H., whereby a shift to overdrive takes place at that speed. But this shift only takes place at 50 M. P. H. if the 266 pounds force of the springs 348 is not augmented by the rearward axial thrust of the sun gear 224 which may, when under full load, be as much as 264 pounds when the gear is made with the helix angle indicated.

It follows that the operator, at 50 M. P. H., may momentarily reduce his applied torque to zero, whereupon the weights 185 will, by first compressing the springs 348, move to their "out" positions and be held there by the detent balls 350 and springs 352. As soon as this occurs, the springs 348 will expand to the limit imposed by the studs 349, but as long as the applied torque is zero and the vehicle thereby drives the engine the sun gear will exert a forward thrust and the discs of the clutch 270 will remain under pressure. When power is again applied, the sun gear thrust will be rearward whereby the overdrive brake 250 will become engaged.

When, however, the operator does not momentarily reduce his applied torque to zero at 50 M. P. H., but instead, let us say, applies full torque, a shift up to overdrive will be delayed until an increase of about 8 M. P. H. is made due to the fact that the applied torque causes a rearward thrust of the sun gear which augments the force of the springs 348 and thereby makes it necessary that a greater surplus of force be generated by the weights 185 over that of the springs 187 before the weights will move to their out position.

The curve w, y, Fig. 11, shows that the torque of an engine as herein specified begins to become less at 2000 R. P. M. From it may be determined that the horsepower, that is, the torque times the speed at which that torque is had begins to drop at about 3500 R. P. M. In direct drive 2000 engine R. P. M. drives the vehicle about 33 M.P.H. while 3500 R. P. M. drives the vehicle about 58 M. P. H.

It will be seen that there is provided a means whereby the operator, by applying maximum torque, may hold the direct drive connection in effect only as long as a speed is not exceeded at which the H. P. begins to diminish. With the mechanism proportioned as indicated he may shift to overdrive at 50 M. P. H. if he so desires, but he may not maintain direct drive beyond 58 M. P. H., the speed at which he would have to maintain it with less total horsepower.

When the mechanism is in overdrive, and the vehicle speed falls to 44 M. P. H. the outward force of the weights 185 is as much less than the inward force of the springs 187 as the holding force of the detent springs 352 and balls 350 whereupon the weights start in. If the operator at this speed happens to momentarily decrease the applied torque to zero, the difference of the spring force over the weight force will at once force the noses 342 past the noses 344, whereupon the direct drive clutch will be engaged. If, however, no release of applied torque occurs, a further reduction, the amount depending on the torque being applied, will be required before the force of the springs 187 exceeds the force of the weights 185 sufficiently to engage the direct drive clutch. If while overdrive is thus in effect and the speed has fallen below 42 M. P. H., the maximum torque is applied, the underdrive gearing will be brought into play while the overdrive gearing is still operative thereby to increase the power without having shifted out of overdrive.

The advantages of the mechanism herein disclosed may be briefly summarized as follows:

By employing, in connection with the mechanism shown, an axle having the relatively low pinion-to-wheel reduction of 5 to 1, in combination with a fluid coupling, a speed range of 0 to 58 M. P. H. may satisfactorily be had in direct drive.

More rapid acceleration may be had thru the underdrive gearing which gives an engine-to-wheel ratio of 8 to 1, said underdrive gear being made effective by momentarily applying a considerable proportion of the full engine torque, said proportion varying with the vehicle speed, less torque bringing in the underdrive gear at the lower vehicle speeds where gearing is more necessary for acceleration. Combined with a fluid coupling the 8 to 1 engine-to-wheel reduction of the underdrive is more effective than 11 to 1 reduction would be when connected directly to the engine.

The 5 to 1 engine-to-wheel reduction while slow where no overdrive is provided yet with 3.548 to 1 overdrive ratio for speeds above 50 M. P. H., the 5 to 1 direct drive ratio is preferable.

While the operator may control within limits, the speed at which the automatic shift from underdrive to direct drive occurs, and the speed at which the automatic shift from direct drive to overdrive occurs, he may not delay a shift in either case much beyond the engine speed at which maximum horsepower may be developed.

The changes from one ratio to another all are made without an interval during which there is no connection between the engine and wheels, that is, the mechanism does not have free wheeling characteristics.

The proportions of the parts herein given are solely for the purpose of assisting those skilled in the art to adapt the mechanism to engines of varying power and vehicles of varying weight and as such are not intended to limit the scope of the invention. To define this scope,

I claim:

1. A gear mechanism comprising a driving member, a driven member, a ring gear secured to the driven member, planet pinions in mesh with said ring gear, a sun gear in constant mesh with said planet pinions, a planet pinion carrier, a toothed clutch for connecting said carrier to the driving member, a toothed brake for holding said carrier against rotation, manual means operable in one direction to engage the clutch and release the brake and in the other direction to release the clutch and apply the brake, and to an intermediate position to release both clutch and brake, centrifugal weights carried by the driven member, weight holding springs for restraining outward movement of said weights, a weight holding collar, holding means on said collar and corresponding holding means on said weights whereby axial pressure of said collar restrains said weights from moving outwardly, a plate clutch normally in engagement for connecting the sun gear to the driving member, clutch engaging springs compacting said clutch plates axially into engagement, means whereby the axial engaging force of said springs is transmitted to said weight holding collar to press the holding means on said collar against the holding means on said weights, whereby the force of the clutch engaging springs is added to the weight holding springs to restrain outward movement of said weights, helical teeth on said sun gear angled to create an axial thrust due to load thereon away from the holding collar when the carrier is disconnected from the driving member and held against rotation and to create an axial thrust against the holding collar when the carrier is connected to the driving member, whereby the weights are further restrained from outward movement in proportion to the torque being transmitted, the holding means being operable upon outward movement of said weights to permit the plates of said clutch to be moved axially away from the clutch engaging springs to disengage said plate clutch by the axial movement of the said sun gear due to load on its helical teeth, and a friction brake engageable to hold said sun gear against rotation operable by further axial movement of said sun gear in the same direction after the said plate clutch is disengaged.

2. A combined overdrive, direct drive, neutral, and reverse mechanism, comprising, a driving member, a driven member, a gear secured to the driven member, planet pinions in mesh with said gear, a sun gear in mesh with said planet pinions, a planet pinion carrier, a clutch and a brake adapted respectively to connect the carrier to the driving member or hold it against rotation, manual means operable in one direction to engage the clutch and release the brake, and in the other direction to release the clutch and apply the brake, and operable to an intermediate position to release both clutch and brake, centrifugal weights carried by the driven member, weight holding springs for restraining outward movement of said weights, a weight holding member for further restraining outward movement of said weights, holding means on said weight holding member and corresponding holding means on said weights whereby an axial force applied to said holding member restrains outward movement of said weights, a friction clutch connecting the sun gear to the driving member, clutch springs normally holding said friction clutch engaged, means whereby the force of said clutch springs is transmitted to the weight holding member, whereby the weights are further restrained from outward movement, helical teeth on the sun gear angled to create an axial thrust due to load thereon in a direction away from the holding member when said carrier is disengaged from said driving member and held against rotation and the sun gear thereby becomes the driving member, and in a direction toward said holding member when said carrier is connected to the driving member and is rotated thereby, whereby the weights are further restrained from outward movement in proportion to the torque being transmitted, the holding means being operable upon outward movement of said weights to permit said friction clutch to disengage, and a friction brake engageable to hold said sun gear against rotation operable by the axial movement of said sun gear due to load on its helical teeth when said carrier is connected to the driving member and said weights have moved outwardly.

3. The structure defined in claim 2 with a detent mechanism for resiliently detaining the centrifugal weights in their outward operated position, and thereby resiliently opposing inward movement of the weights.

4. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, a clutch and a brake adapted respectively to secure said carrier to the driving member or hold it against rotation, manual means operable to either engage the clutch and release the brake or to release the clutch and apply the brake, or to release both clutch and brake at the same time, a centrifugal device carried by the driven member, restraining springs for holding said centrifugal device inoperative, a friction clutch for connecting the sun gear to the driving member, clutch springs for holding said clutch engaged, holding means actuated by the force of said clutch springs during clutch engagement to assist in holding said centrifugal device inoperative, helical teeth on the sun gear angled to create an axial thrust in proportion to the load thereon, said thrust being in one direction when said carrier is disengaged from said driving member and held against rotation and the sun gear thereby becomes the driving member, and in the other direction when said carrier is connected to the driving member and is rotated thereby, said thrust when it is in the second said direction being also applied through the holding means to the centrifugal device to assist in holding it inoperative, and a brake engageable to hold said sun gear against rotation operable by the axial movement due to thrust in the second said direction when said first friction clutch is disengaged, said holding means being adapted to prevent the said axial movement due to thrust in the second said direction when said centrifugal device has not operated and permit said axial movement in the second said direction after said centrifugal device has operated.

5. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, a clutch for connecting the carrier to the driving member, a brake for holding the carrier non-rotative, manual means for controlling said clutch and brake, a centrifugal weight carried by the driven member operable from an "in" to an "out" position, restraining springs holding said centrifugal weight in the "in" position, a friction clutch connecting the sun gear to the driving member, held in its engaged position by the centrifugal weight when said centrifugal weight is in the "in" position, helical teeth on the sun gear angled to create an axial thrust due to torque transmitted thereby, said axial thrust being in a direction to urge engagement of said friction clutch when said carrier is held against rotation and the sun gear thereby becomes the driving member, and to urge disengagement of said friction clutch when said carrier is connected for rotation with and driven by said driving member, means thru which said sun gear thrust in the clutch disengaging direction is applied to said centrifugal weight to hold it in the "in" position whereby said centrifugal weight is held against operation to a higher speed as the gear thrust is greater, and a brake engageable to hold said sun gear against rotation operable by the sun gear thrust in the direction which urges disengagement of the friction clutch.

6. A combined overdrive, direct drive, neutral, and reverse gear mechanism comprising, a driving member, a driven member, a gear secured to said driven member, planet pinions in mesh with said gear, a sun gear in mesh with said planet pinions, a planet pinion carrier, means for selectively connecting the carrier to the driving member, for holding said carrier against rotation or for permitting said carrier to revolve freely, speed responsive means on the driven member, a friction clutch connecting the sun gear to the driving member held engaged by the speed responsive means when said speed responsive means has not operated, a brake for holding the sun gear against rotation, helical teeth on the sun gear, and means whereby said helical teeth apply pressure in proportion to the torque transmitted to increase engagement of the first clutch when the carrier is held against rotation, apply pressure in proportion to the torque transmitted to increase engagement of the brake when said carrier is connected to the driving member and the speed responsive means has operated, and apply pressure in proportion to the torque transmitted to oppose operation of the speed responsive means when the carrier is connected to the driving member and the speed responsive means has not operated.

7. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, means to connect said carrier to the driving member for rotation therewith, means to connect said carrier to a stationary member to hold it against rotation, and means to disconnect said carrier from both the driving member and the stationary member, speed responsive means on the driven member, a friction clutch connecting the sun gear to the driving member held in engaged position by the speed responsive means when said speed responsive means has not operated, helical teeth on the sun gear angled to create an axial thrust due to torque transmitted thereby, said thrust being in a direction to urge disengagement of said friction clutch when said carrier is connected to and rotated by the driving member, means to apply said thrust to hold said speed responsive means from operating whereby the said friction clutch is maintained in engagement longer as the torque being transmitted is greater, and a brake for holding said sun gear against rotation engageable by said axial thrust after said clutch has been disengaged thereby.

8. A combined overdrive, direct drive, neutral, and reverse gear mechanism comprising, a driving member, a driven member, a gear secured to said driven member, planet pinions in mesh with said gear, a sun gear in mesh with said planet pinions, a planet pinion carrier, means for optionally connecting the carrier to the driving member, for holding said carrier against rotation or for permitting said carrier to revolve freely, speed responsive means on the driven member, a friction clutch connecting the sun gear to the driving member held engaged by the speed responsive means as long as said speed responsive means has not operated, helical teeth on the sun gear angled to create an axial thrust urging disengagement of said clutch and means on said speed responsive means to receive said thrust to hold it from operating whereby said speed responsive means remains inoperative to a higher speed as the torque carried by said sun gear is greater, and a brake for holding said sun gear against rotation engageable by said axial thrust upon operation of said speed responsive means.

9. A combined overdrive, direct drive, neutral, and reverse gear mechanism comprising, a driving member, a driven member, a gear secured to said driven member, planet pinions in mesh with said gear, a sun gear in mesh with said planet pinions, a planet pinion carrier, means for selectively connecting the carrier to the driving member, holding the carrier against rotation or allowing said carrier to revolve freely, a friction clutch for connecting the sun gear to the driving member, a brake for holding the sun gear against rotation, speed responsive means on the driven member adapted, before it has operated, to maintain engagement of the clutch and disengagement of the brake, and helical teeth on the sun gear angled to provide an axial thrust due to torque transmitted thereby urging disengagement of the clutch and engagement of the brake and means actuated by said thrust holding the speed responsive means from operating.

10. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, means for selectively connecting the carrier to the driving member, holding the carrier against rotation or allowing said carrier to revolve freely, clutch means for connecting the sun gear to the driving member, brake means for holding the sun gear against rotation, speed responsive means on the driven member adapted, before it has responded to speed, to maintain engagement of the clutch means and disengagement of the brake means, and means operated by torque load on the sun gear urging disengagement of the clutch means and engagement of the brake means and means operated by said torque load opposing operation of the speed responsive means.

11. A combined direct drive and overdrive gear mechanism comprising, a driving member, a driven member, a gear secured to the driven member, planet pinions in mesh with said gear, a sun gear in mesh with said planet pinions, a planet pinion carrier, means for rotating the carrier by the driving member, friction clutch means on the driving member, corresponding friction clutch means on the sun gear, speed responsive means on the driven member, adapted before it has responded to speed to hold the second friction clutch means in contact with the first, and after it has responded to speed to permit the second friction clutch means to move away from the first, a friction brake means on the sun gear, a second friction brake means on the housing, and means for holding the first and second friction brake means in contact, operative upon operation of the speed responsive means.

12. The structure defined in claim 11 wherein the sun gear has helical teeth operative under load to create an end thrust in a direction to hold the first and second friction brake means in engagement after the speed responsive means has moved to its operative position and permitted said first and second friction clutch means to move out of contact.

13. A combined direct drive and overdrive gear mechanism comprising, a driving member, a driven member, a gear secured to the driven member, planet pinions in mesh with said gear, a sun gear in mesh with said planet pinions, a planet pinion carrier, means for connecting the carrier to the driving member, clutch means for connecting the sun gear to the driving member, brake means for holding the sun gear against rotation, speed responsive means on the driven member adapted, after it responds to speed, to effect engagement of the brake means and disengagement of the clutch means, and means actuated by the reaction to torque load carried by the gearing opposing response of said speed responsive means, whereby engagement of the brake means and disengagement of the clutch means is retarded.

14. Overdrive transmission mechanism comprising, a driving member, a driven member, a gear on the driven member, planet pinions in mesh with said gear, a planet pinion carrier, means connecting said carrier to the driving member, a sun gear in mesh with said planet pinions, a friction clutch means on the driving member, a stationary friction brake means, a first and second friction means on the sun gear adapted respectively to engage the said friction clutch means and friction brake means by movement of, said sun gear being operable axially in one or the other direction, a speed responsive device on the driven member, adapted below a determined speed to hold said first friction means in engagement with said driving member friction clutch means, and helical teeth on said sun gear angled to create a thrust to move said sun gear and second friction means axially into engagement with said stationary friction brake means when said speed responsive device ceases to hold said first friction means in engagement with said driving member friction clutch means.

15. Overdrive transmission mechanism comprising, a driving member, a driven member, a gear on the driven member, planet pinions in mesh with said gear, a planet pinion carrier, means connecting said carrier to the driving member, a sun gear in mesh with said planet pinions, a friction clutch means on the driving member, a stationary friction brake means, a plurality of friction means on the sun gear operable axially in two directions, a speed responsive device on the driven member adapted below a determined speed to hold some of said sun gear friction means in engagement with said driving member friction clutch means, and means operable by load on the gearing to move other of the sun gear friction means axially into engagement with the stationary friction brake means.

16. Power transmission mechanism comprising, a housing, a driving member, a driven member, gears for connecting said members, one of said gears being secured to the driven member, a clutch for connecting one of said gears to the driving member to rotate therewith, a friction brake for connecting one of said gears to the housing to hold it non-rotative, a speed responsive means on the driven member operative, before it has responded to speed to hold the clutch engaged and the brake disengaged, and pressure means operative by torque load on one of said gears after said speed responsive means has responded to speed and released said clutch, to hold said friction brake engaged with a force which varies according to the torque being transmitted.

17. The structure defined in claim 16 wherein the pressure means is operated by the end thrust of the helical teeth on one of said gears.

18. Power transmission mechanism comprising, a housing, a driving member, a driven member, a gear on the driven member, planet pinions adapted to be revolved by the driving member in mesh with said gear, a second gear in mesh with said planet pinions, a clutch for connecting said second gear to the driving member to rotate therewith, a friction brake for connecting said second gear to the housing to hold it non-rotatable, said gear having torque responsive means for holding said brake applied, and a speed responsive means operative before it has responded to speed to hold said clutch engaged and said torque responsive means inoperative to apply said brake.

FREDERICK W. COTTERMAN.